Dec. 5, 1950

C. J. YOUNG 2,532,799

FACSIMILE SYSTEM HAVING ROTATING SCANNER
MOVING LONGITUDINALLY WITHIN
STATIONARY TRANSPARENT DRUM

Filed Aug. 1, 1944

3 Sheets-Sheet 1

INVENTOR
Charles J. Young
BY H. S. Grover.
ATTORNEY

Dec. 5, 1950 C. J. YOUNG 2,532,799

FACSIMILE SYSTEM HAVING ROTATING SCANNER MOVING LONGITUDINALLY WITHIN STATIONARY TRANSPARENT DRUM

Filed Aug. 1, 1944 3 Sheets-Sheet 2

INVENTOR
Charles J. Young
by H. S. Grover,
ATTORNEY.

INVENTOR
Charles J. Young
by H. S. Grover,
ATTORNEY.

Patented Dec. 5, 1950 2,532,799

UNITED STATES PATENT OFFICE 2,532,799

FACSIMILE SYSTEM HAVING ROTATING SCANNER MOVING LONGITUDINALLY WITHIN STATIONARY TRANSPARENT DRUM

Charles J. Young, Princeton, N. J., assignor to Radio Corporation of America, a corporation of Delaware Application August 1, 1944, Serial No. 547,550

10 Claims. (Cl. 178—7.1)

The present invention relates to a system and apparatus for facsimile telegraphy and more particularly to a novel facsimile machine including an optical arrangement for developing a special signal.

Generally speaking, this invention is directed to a form of facsimile apparatus in which the copy sheet is curved so that it may be traversed rapidly by a movable scanning point. This disposition of the elements permits the use of a rotary scanning head substantially concentric with the curved subject copy sheet. Scanning apparatus very generally of this nature is disclosed in the copending application of Charles N. Gillespie, Serial No. 484.383, filed April 24, 1943, now Patent No. 2,443,953, granted June 22, 1948. However, in accordance with the present invention, the copy or record sheet is stationary, and the scanning point is advanced to obtain line by line scanning. In the description of the illustrative embodiment of the invention, which occurs hereinafter, a photoelectric scanning system for generating image signals will be described in detail, but as will be pointed out at appropriate places hereinafter, a machine embodying features of this invention may be constructed so as to function as a recorder of facsimile signals and therefore claims appended hereto and directed to a facsimile machine are intended to cover both transmitters and recorders constructed in accordance with the teachings of the present invention.

A scanner with a stationary cylinder for the subject copy facilitates rapid reloading, an essential feature in high-speed facsimile operation. In the invention this result is attained by a mechanism directly coupled to the driving motor. Errors in synchronism are avoided by not using gears or belts.

Furthermore, this result is attained in a minimum overall length considering that the scanner, recorder, and motor are arranged on one axis. This minimum length results from the telescoping of the scanner shaft into the recorder helix drum. Minimum length is also attained by the short scanning carriage of this invention.

The feature of an exciter lamp rotating with its filament on the axis, and a phototube also on the axis but non-rotating, is important. A stationary lamp is not practicable because the image of its filament will rotate as it passes along the surface of the copyholder, unless elaborate optical measures are taken to prevent it. On the other hand, the phototube and first amplifier must be closely associated electrically and it is not desirable to rotate them both because a large number of slip rings would be required to handle the circuits.

Also, in accordance with this invention, a novel facsimile machine is provided in which the subject matter to be scanned occupies substantially the entire circumference of the scanner so that the scanning point, which in a transmitter may, for example, be a focused beam of light exciting a phototube, scans the copy sheet upon which the subject matter is inscribed or otherwise impressed along one dimension for each line operation of the scanner. Highly efficient scanning is attained in this manner by the use of a single exploring point, thus eliminating the necessity for accurately aligning two or more scanning points so that they will invariably follow the same path. Also, a machine so constructed that the subject copy sheet occupies effectively the entire circumference of the scanner may be built more compactly than scanners employing a plurality of scanning points.

The means for imparting driving movement to the scanning head and maintaining a fixed relationship between the scanning head and a copy holder during a scanning operation in a facsimile machine of the type in which a message sheet is curved so as substantially to surround the scanning head are important features of the present invention. Appropriate marking means will, of course, be used in a recorder utilizing inventive features of this invention.

The construction of the machine of the present invention is such that a portion of each scanning line is inherently reserved for the generation of a special or indicial signal. A novel arrangement for obtaining this special signal is disclosed herein.

Apparatus for accomplishing these results comprises essentially a frame or support upon which is mounted a movable scanning instrumentality which includes a scanning head adapted to rotate with respect to the copy holder and to traverse the copy holder axially. A drive motor situated exteriorly of the copy holder imparts a motion of rotation directly to the scanning head, and a suitable advance mechanism provides the coordinated axial movement of the scanning head. A photocell which is energized in accordance with light reflected through the scanning head develops an image signal output. The photocell is energized by light of undiminished brilliance from the light source to develop the special or indicial signal.

In view of the foregoing, the principal aim of the invention is to provide a novel facsimile scanner of the type in which a message sheet is curved and is scanned along one dimension by a single exploring point.

Another object is to provide for the generation of a special signal in a novel manner between scanning line intervals.

Still another object is to provide a novel facsimile machine having an optical scanner in which the scanning head is concentric with a stationary transparent cylindrical copy holder which surrounds the scanner head so as to provide a line scanning operation and a special signal generating operation for each revolution of the scanner head.

Other objects and advantages of the present invention will, of course, become apparent and immediately suggest themselves to those skilled in the art to which the invention is directed from a reading of the following specification in connection with the accompanying drawings in which.

Figures 2, 3:
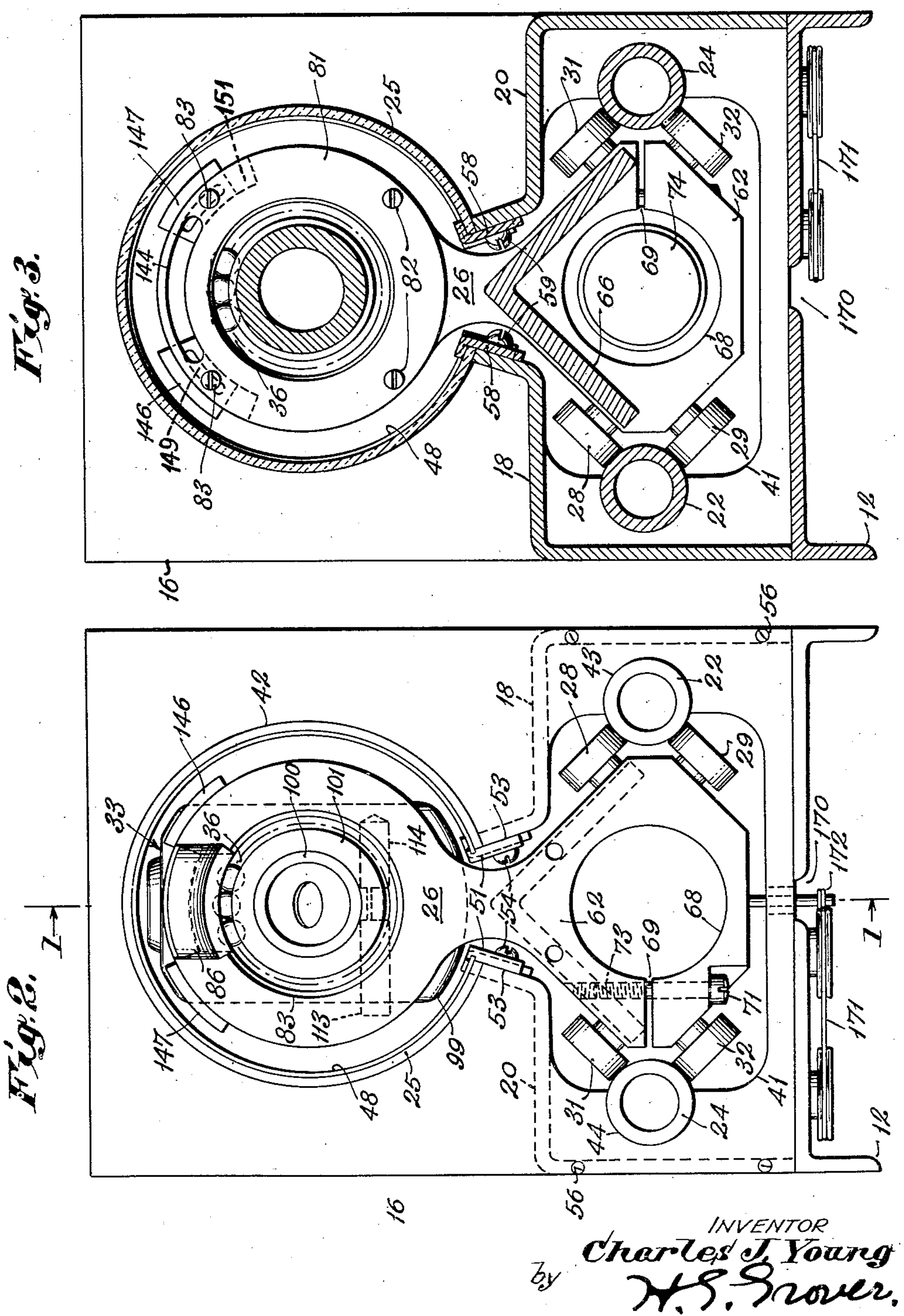
Fig. 2 is a detailed view in end elevation taken partly in section on line 2—2 of Fig. 1.
Fig. 3 is a sectional view similar to Fig. 2 but taken on line 3—3 of Fig. 1.
Figure 4:
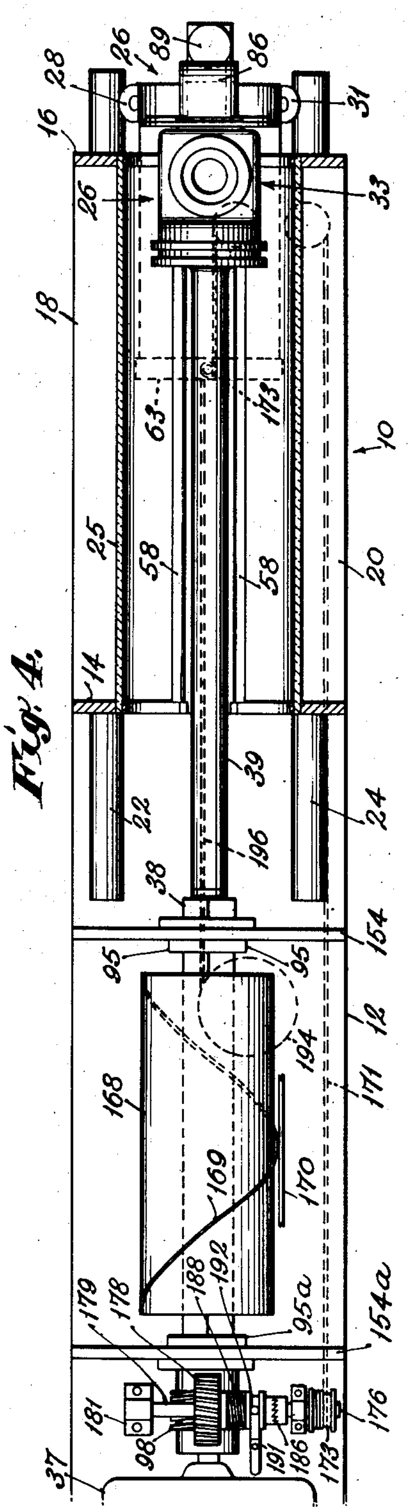
Fig. 4 is a view in plan, drawn to a reduced scale and partly in horizontal section of the complete machine of Fig. 1.

Referring to the drawings and for the present to Figs. 3 and 4 thereof, a machine 10, constructed to embody the present invention, is disclosed which comprises a base 12 forming the principal support for the operating parts and driving mechanism. Mounted upon this base is a supporting frame for supporting the copy holding means and the scanning carriage guide means comprising end plates 14 and 16 for supporting and positioning guide rails 22 and 24 and a pair of angularly shaped spacing members 18 and 20. This frame, composed of the parts just mentioned, in addition to supporting the guide rails 22 and 24, also serves to support and position a transparent stationary cylindrical copy holder or message sheet support 25. A scanning carriage indicated generally by reference character 26, which will be described more in detail hereinafter, is movably mounted on the guide rail 22 by a pair of rollers 28 and a pair of rollers 29, and on the guide rail 24 by a pair of rollers 31 and a pair of rollers 32.

Figure 6:
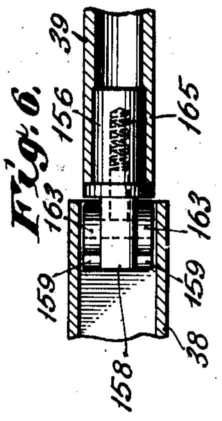
Figs. 5 and 6 are details drawn to an enlarged scale of certain of the parts shown in Fig. 4.
Figure 5:
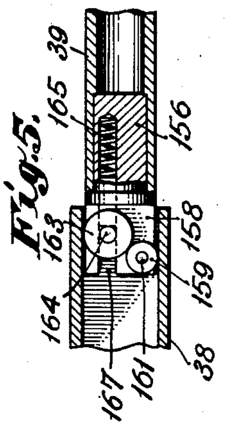

A scanning head 33, also to be described more in detail hereinafter, is rotatably mounted on the carriage by means of a ball bearing assembly 36. A motor 37, secured to the base 12, imparts driving power to the scanning head 33 by way of a telescoping connection comprising a square tubular shaft 38 and a shaft 39 secured to the scanning head 33. Details of the connection between the telescoping shafts 38 and 39 are shown in Figs. 5 and 6 and will be described hereinafter.

Figure 1:
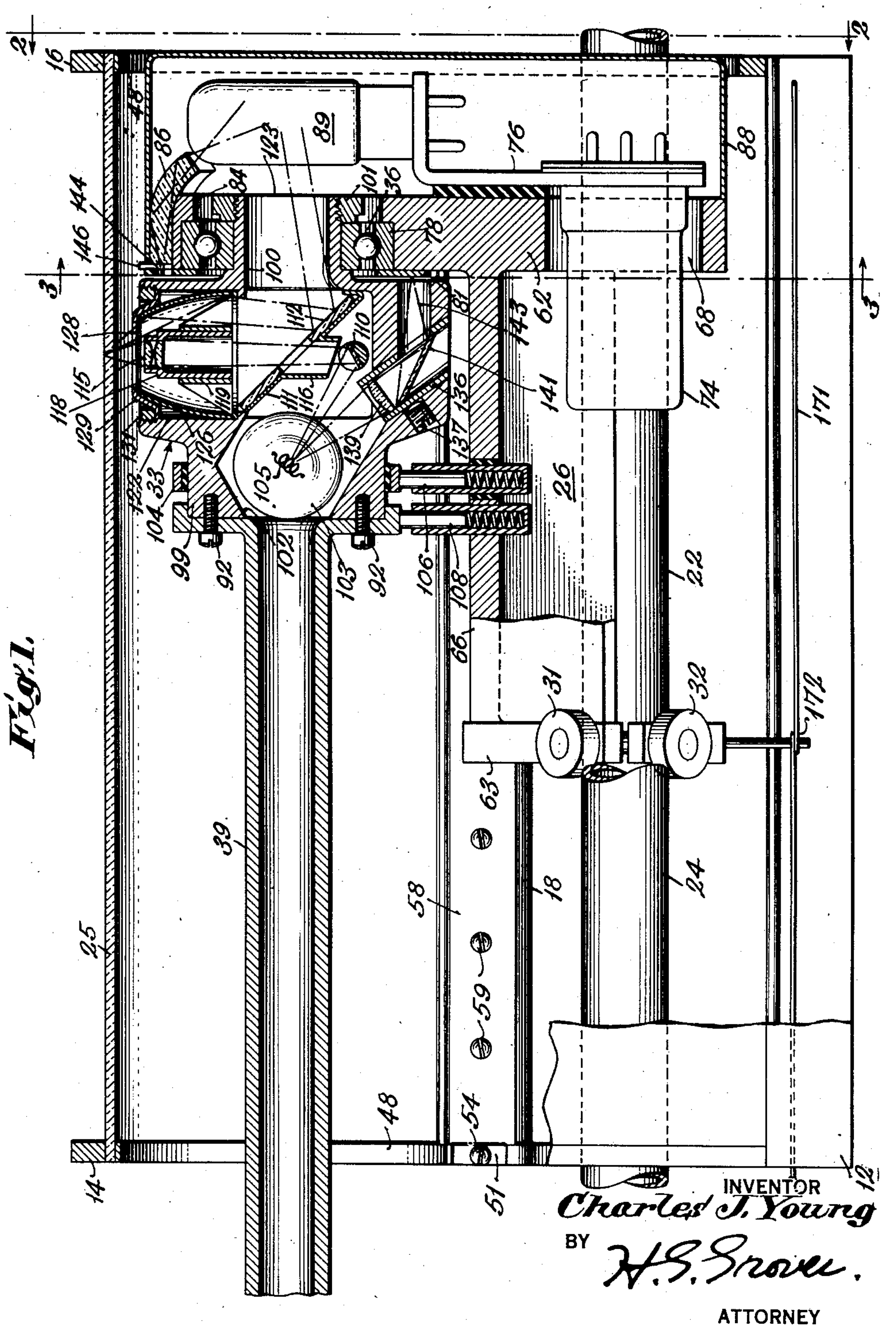
Fig. 1 is an elevational view of a portion of a machine embodying the invention taken partly in section on line 1—1 of Fig. 2.

Referring now to Figs. 1, 2, and 3, the details of the support for the transparent copy holder cylinder 25 and the guide rails 22 and 24 will now be described. The end plate members 14 and 16 are similar and therefore a detailed description of member 16, appearing in Fig. 2, will be given. A single opening 41 (Fig. 2) is provided in the end plate having a principal circular section 42 and other circular sections 43 and 44. The outline of these three circular sections is preferably carefully machined and their centers are carefully located with respect to each other so that the guide rails 22 and 24, seated in the sections 43 and 44 respectively are accurately positioned with respect to the copy holding cylinder 25 which is seated at or adjacent its end in the circular section 42. Each end of the copy holder 25 is retained in position in the circular section 42 of the aperture by means of a ring 48 (Figs. 1 and 2) which is forced outwardly against the copy holder by blocks 51, each of which is secured to the sloping edge 53 of the opening 41 by suitable fastening means such as a screw 54. The same arrangement is employed to secure both ends of the copy holder 25 in the plate 14 and the plate 16, and similar reference characters have been used on Fig. 1 to indicate the fastening for the plate 14. The angularly shaped spacing members may be secured at their ends to the plates 14 and 16 by screws 56 or the like. The lower edges of the copy holder 25 are continuously supported between the plates 14 and 16 by the upper edge of each spacing member 18 and 20, respectively and an angle member 58 (Figs. 1 and 3). Each angle member is secured to its respective spacing member by means of screws or other suitable fastening means 59.

The carriage 26, which rotatably supports the scanning head 33, will now be described in detail. It comprises an end member 62 having a configuration which is best shown by Figs. 2 and 3 of the drawings and an end member 63. These two end members are joined by an angularly shaped member 66 secured to each in any suitable manner such as by welding. The end member 63 is shaped like the lower part of the end member 62, and the latter is seen to be generally diamond shaped in outline with a centered aperture 68. A slot 69 between the points of connection of the rollers 31 and 32 on each end member provides for adjustment of the carriage upon the guide rails 22 and 24. This adjustment is effected by a pinch screw 71 which is threaded into a hole 73. The aperture 68 conveniently receives one of the tubes 74 of a preamplifier (not shown in detail) which is carried by a bracket 76 shock mounted on the end member 62 of the carriage.

The upper end of the end member 62 is substantially circular in outline as shown and is fitted with the outer race member 78 of the previously mentioned ball bearing assembly 36.

A ring 81 (Figs. 1 and 3) secured to the end member 62 by any suitable fastening means, such as screws 82 and 83, assists in retaining the race 78 in the recessed opening 84. A curved transparent or translucent light transmitting member 86, preferably formed of plastic or quartz, for which the material known by the trade-mark "Lucite" has been found useful. This element 86 is seated in a curved recess formed at the top of the member 62. The light transmitting member 86 may be retained in position in this recess by a housing member 88 (Figure 1) which fits over the end member 62 to protect and electrically shield the parts mounted on the bracket 76 among which is a phototube or a photocell 89. The photocell 89 generates signals representative of pieces of subject copy on the copy holder 25, and also generates special signals by means of light of substantially undiminished brilliance transmitted at intervals through the member 86.

The previously mentioned scanning head 33 is secured, for example, by screws 92 to the drive shaft 39 which, as previously stated, has a telescopic connection with the squared shaft 38. The latter is rotatably supported in sleeve bearings 95 and 95a. The end of the shaft 38 carries worm 98 and is coupled to the motor 37. The arrangement just mentioned, together with the bearing assembly 36, provides for accurate alignment of the center of the rotatable scanning head 33. The inner race of the bearing assembly 36 is held in position on the tubular end 100 of the scanner body 99 by means of a threaded ring nut 101.

A recess 102, which may be in the form of a transverse passage, accommodates a rotatable scanning lamp 103 to which access is had through the transverse portion of the recess 102. The filament 105 of the lamp 103 is effectively on the axis of rotation. The photo-tube 89 is also effectively on the axis of rotation but preferably is stationary for reasons stated. A slip ring 104 provides an electrical connection to one terminal in the lamp 103 from a brush 106, the other end of the lamp being grounded on metallic parts of the scanning head 33. A low resistance ground connection is provided by a second brush 108 which bears on the periphery of the shaft coupling.

The sharply focused luminous spot, which scans a sheet in position on the copy holder 25, is provided by an adjustable mirror 110 from which light is projected through aligned openings in a mirror support 111 and a mirror 112 and through a lens combination 115. The mirror 110 may be adjustably mounted in a convenient manner by forming a reflecting surface on or securing the mirror 110 to a rod 113 (Fig. 2) which is insertable in a transverse bore 114 in the body portion 99. A tubular member 116 which is or may be integral with the mirror holder 111 serves as a light baffle for the scanning beam which is projected from the mirror 110 and prevents any light from passing directly from lamp 103 to phototube 89. The angle of the transverse bore 102, the orientation of the lamp in this bore, and the position of the mirror 110 are made such that the image of the filament coil at the outer surface of the copy holder 25 shall be parallel to the axis of the cylinder 25.

The lens combination 115 is seated in a lens tube 118 which is adjustable telescopically in a lens tube holder 119, the latter being seated against the shoulder of a cylindrical recess 122 which communicates with a bore 123 in the end 100 of the body portion 99. A reflector 126, substantially ellipsoidal in shape with one focus on the surface of the copy holder 25 and the other at the plate of the phototube 89, so as to collect the maximum amount of light reflected from the message sheet, rests on one end on the lens tube holder 119 and supports a transparent member 128 at its upper end. The lens tube holder 119 and its associated parts, including the reflector 126 and the member 128 are held in position by a clamping member 129 secured by a threaded ring 131 which engages threads formed at the outer end of the recess 122. Reflected light which is collected from the message sheet by the reflector 126 is projected by the mirror 112 on to the phototube 89 through the bore 123, the center of the beam lying along the axis of rotation so that the spot of light shall remain substantially in one position on the phototube plate.

The optical system just described for scanning a message sheet on the copy holder 25 is accurately positioned relative to the copy holder 25 in the manner previously pointed out by the accurate location of the section 42 and the sections 43 of the aperture 41 in each end plate 14 and 16 so that the optical path from the light source, shown illustratively as the lamp 103, to the subject and from there back to the phototube is always identical. Since defocusing of the scanning beam is prevented, adequate sharpness in the received image will be present.

The special or indicial signal provided by projecting light of relatively undiminished brilliance from the lamp 103 onto the phototube 89 is generated by the following apparatus. A tube 136 is secured in an inclined recess in the body member 99 by a set screw 137 and contains a lens 139 and a mirror 141. A beam of light 143 from the lamp 103 is focused sharply in the plane of the ring member 81 by the lens 139, the optical path from the lens including the mirror 141. Since specular reflection is obtained from the mirror 141, the light intensity in the plane of the ring 81 is more intense than the light intensity projected onto the phototube over the optical path from the normally less reflective surface of the message sheet on the copy holder 25. In the position of the parts shown in Fig. 1, the scanning beam from the lens 115 is midway of its scanning traverse, and the beam projected through the lens 139 is obstructed by the surface of the ring 81. When the scanning beam has completed its scanning traverse, that is to say, after it has passed beyond one edge of the copy holder 25 and is moving in the idle space between the brackets 58 (Fig. 3), the arcuate slot 144 in the ring 81 permits the beam from the lens 139 to impinge on the exposed end of the light conducting member 86 which projects it with substantially undiminished intensity into the phototube 89. Accurate adjustment of the time duration and the time at which the illumination of the photocell by the beam 143 begins and ends is provided by arcuately movable shims 146 and 147, each of which is provided with an elongated slot 149 through which the screw 83 is passed. To insure proper seating of the shims 146 and 147, an arcuate recess 151 is preferably provided in the face of the carriage end member 62 so that the screws 83 serve to clamp the shims between the bottom of this recess and the rear face of the ring 81.

The shaft 39, as previously stated, fits telescopically in the squared shaft 38 which is rotatably supported at both ends in the sleeve bearings 95 and 95a.

The sleeve bearing 95 is rotatably carried by a bearing plate or pedestal 154 and bearing 95a by plate 154a (Fig. 4). To avoid any undue vibration at the end of the shaft 39 which would cause irregularities in the received copy, the arrangement shown more in detail in Figs. 5 and 6 is employed. This arrangement provides firmness to prevent angular lost motion of the telescoped shafts while permitting a free sliding action. The shaft 39 is fitted with a plug 156 which has a rectangularly shaped extension 158 (Figs. 5 and 6). The smaller dimension of this rectangle is such that space is provided between the interior walls of the shaft 38 and the plug 158 to accommodate a roller 159 on each side. These rollers 159 are carried by a pin 161 fixed in the rectangular extension, 158. A pair of rollers 163 are mounted on a floating pin 164 which slides in an open ended slot 167. A compression spring 165 presses the pin 164 forwardly so that the rollers 163 contact the rollers 159 and a wall of the squared shaft 38. This arrangement permits the shaft 39 to be slidable freely in the square shaft 38 but maintains a concentric and rigid angular relationship between these shafts.

The ring 48 and the blocks 51 may be brazed together so as to insure location of the parts. All metal parts preferably are accurately positioned by measurement before locating the light transmitting copy holder 25.

The helix drum 168 of a recorder, similar to that disclosed in the Young Reissue Patent No. 20,152, granted October 27, 1936, is carried on the shaft 38 between the plates 154 and 154*a*, detailed parts of the recorder not being shown. The drum 168 is provided with a helix 169 which cooperates with the printer bar 170. Application of signals to the printer bar for electrolytic recording may be accomplished in any well known manner, or the bar may oscillate in response to signals for carbon recording as shown in the Young patent referred to. Thus, the machine of the invention is a scanner-recorder for either sending or receiving, or both.

The carriage 26 is moved toward the right, as viewed in Figs. 1 and 4, during a scanning operation by a cord 171, secured to the carriage at the point indicated by reference character 172. A slot 170 in the base 12 accommodates the connection 172. The cord 171 is wound on a drum 173 secured to a shaft 176 which is driven by a worm wheel 178 from the worm 98. A bearing bracket 177 rotatably supports the shaft 176. The worm wheel 178 is secured to a shaft 179 supported by a bearing bracket 181. These shafts 176 and 179 are interconnected by any known type of releasable clutch, for example the toothed dog clutch 186. The driving member of the clutch is normally forced into engagement with the driven member by a compression spring 188 and clutch release is effected by a lever 191 which is forked to engage a clutch release collar 192. When the clutch 186 is released, a spring tension drum 194 winds up a cord 196 which returns the carriage 26 to the left in preparation for a succeeding scanning operation.

The complete machine which has just been described is capable of operation as a transmitter to produce image signals representative of subject matter mounted upon the copy holder 25 and also to produce special signals bearing a predetermined time relationship with respect to each train of image signals constituting a scanning line. The message sheet, which normally will have a width equal to the circumference of the transparent copy holder 25 minus the gap between clamps 58, may be secured in any suitable manner upon the copy holder, and it is to be noted that inasmuch as the copy holder is stationary, an elaborate holding arrangement is unnecessary. Spring clips may be employed for this purpose. Use of the novel machine as a recorder has been mentioned above, and its operation in this capacity will not be described in detail.

Figure 7:
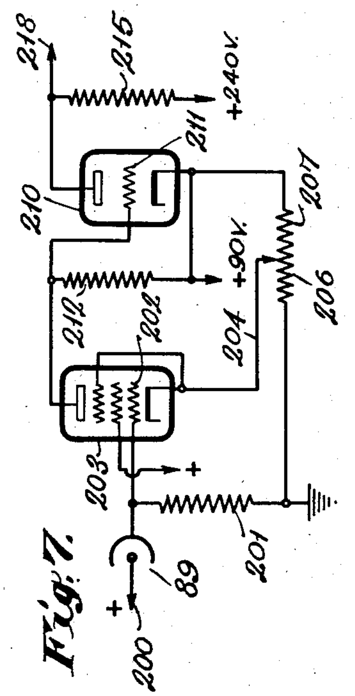
Fig. 7 is a diagrammatic showing of a system in which a machine or machines of the present invention may be employed to provide facsimile communication.

Fig. 7 of the drawings shows, illustratively, a portion of a typical facsimile system in a simplified form which may be similar to that disclosed in Patent No. 2,326,740, granted to Maurice Artzt, August 17, 1943. This system of Fig. 7 shows illustratively one use of the special signal generated by the direct beam 143 when it occurs in the interval between the scanning lines. Other uses will occur to those skilled in the art.

The phototube 89 of Fig. 7, which is, for purposes of illustration, the phototube of the machine 10 shown in Fig. 1 of the drawings, has its anode lead connected to any desired source of positive potential 200. The cathode of this tube is connected to ground through a load resistance 201, and the control grid 202 of a tube 203 is connected to a positive point on this resistance. The tube 203 may correspond to the tube 74 of Fig. 1. The cathode and suppressor grid of the tube 203 are connected by a conductor 204 to a point on a potentiometer which is indicated by reference characters 206 and 207 joined between ground and the cathode of a tube 210. The tube 210 has its grid 211 connected to the plate of the tube 203. This last described connection is a modification of the system shown in the above noted Artzt patent inasmuch as it is not necessary to employ a commutator or other separate arrangement to obtain the special signal which is employed in the system of Fig. 1 of the patent for phasing the copy. The screen grid of the tube 203 may be connected as shown to a suitable source of positive voltage. The plate of the tube 203 is connected through a resistance 212 to a positive source of plate voltage which is also connected to the cathode of the tube 210. The tubes 203 and 210 are D. C. amplifiers for the image signal output which may be employed in any desired manner or in accordance with the above noted Artzt patent. The output may be obtained, conveniently, by connecting the anode of the tube 210 through an appropriate resistance 215 to a source of relatively high positive voltage. The final output of the D. C. amplifier appears at the point 218.

Assuming that a message sheet with subject matter for transmission is secured to the copy holder 25 in the manner previously discussed, and that the clutch 194 of Fig. 4 has been released to place the scanning carriage 26 in its initial position at the left of Fig. 1; the scanning head 23 will rotate, and the carriage will advance to the right upon engagement of the clutch at an appropriate speed to give equally spaced scanning lines. For each revolution of the scanning head a continuous train of image signals will be generated followed by an accurately timed phasing signal. The latter occurs when the sharply focused beam 143 is transmitted through the light transmitting member 86 directly to the phototube 89. This results in the production of a "super-white" phasing signal in the apparatus of Fig. 7.

The arrangement of the carriage parts and the guide rails 22 and 24 is such that the carriage may readily be removed by drawing it toward the right as viewed on Fig. 1 of the drawings until the rollers secured to the member 63 have been disengaged from the guide rails. This process is simply reversed in order to re-install the same carriage, a similarly equipped carriage, or a carriage equipped with a recording lamp to record signals photographically, for example. The scanning point is effective from one end of the copy holder 25 at the plate 14 to the other end at the plate 16.

Various alterations may be made in the present invention without departing from the spirit and scope thereof, and it is desired that any and all such alterations be considered within the purview of the present invention as defined by the hereinafter appended claims.

Having now described the invention, what is claimed and desired to be secured by Letters Patent is the following:

1. Facsimile apparatus comprising a cylindrical light transmitting copy holding member for supporting a message sheet, a rotary scanning device positioned internally of said copy holder with said scanning device being adapted to rotate upon an axis substantially coinciding with the axis of said copy holder, means for causing said rotary scanning element to move longitudinally of said copy holder, supporting means including guide elements positioned externally of said copy holder but parallel thereto, carriage means for traversing said guide elements, and means extending through a longitudinal slot in said copy holder for interconnecting said scanning device and said carriage means.

2. Facsimile apparatus comprising a cylindrical light transmitting copy holder, a rotary scanning device positioned internally of said copy holder, means supporting said scanning device for rotation upon an axis coinciding with the axis of said holder, said copy holder having a slot longitudinally thereof, said scanning device being provided with a slot in a predetermined angular position with respect to said longitudinal slot, and means energized from said scanning device through said slot in said scanning device for developing a special signal once in each revolution of said scanning device when said scanning device comes into register with said slot in said copy holder.

3. Facsimile apparatus having a transmitting scanner and a recording scanner, said transmitting scanner comprising a stationary copy holder, a rotatable scanning device associated with and within said copy holder, means for axially advancing and rotating said scanning device within said copy holder, and an extensible driving connection between said last named means and said recording scanner.

4. Facsimile apparatus having a transmitting scanner and a recording scanner, said transmitting scanner comprising a stationary cylindrical copy holder, a rotatable scanning device concentric with and movable internally of said copy holder, means extending through the axis of said copy holder for advancing and rotating said scanning device, and an extensible driving connection between said last named means and said recording scanner.

5. A facsimile scanner comprising a cylindrical light transmitting copy holder, a scanning device, a carriage member for supporting said scanning device adapted to pass through a longitudinal slot in said copy holder, said scanning device being concentric with said cylinder and axially movable with said carriage, said scanning device having a light source located on the axis of concentricity, optical means for producing a scanning light spot on a surface of said copy holder and arranged to direct the reflected light from the subject matter in contact with said surface so that it passes out of said scanning device along said common axis, and a phototube on said carriage to receive said reflected light.

6. Facsimile apparatus comprising a cylindrical light transmitting copy holding member for supporting a message sheet, a rotary scanning device positioned internally of said copy holder with said scanning device being adapted to rotate upon an axis coinciding with the axis of said copy holder, support means including guide elements substantially parallel to said cylinder, means for causing said rotary scanning element to move longitudinally of said copy holder, carriage means for traversing said guide elements, and means interconnecting said scanning device and said carriage means extending through a longitudinal slot in said copy holding member.

7. Facsimile apparatus comprising a cylindrical light transmitting copy holder, a rotary scanning device positioned internally of said copy holder, means supporting said scanning device for rotation upon an axis coinciding with the axis of said copy holder, means energized from said scanning device for developing an indicial signal once for each revolution of said scanning device, and an adjustable means for setting the time duration and time of occurrence of said indicial signal.

8. A facsimile machine comprising a stationary cylindrical copy holder, a movable scanning head in said copy holder, means to support said movable scanning head within said copy holder, a scanning head drive shaft extending externally of said copy holder, a hollow power drive shaft axially aligned with said scanning head drive shaft to receive said scanning head shaft internally thereof, means internally of said drive shaft for causing both of said shafts to be rotatable as a unit but permitting free sliding action therebetween and a complete disengagement of said shafts to permit removal of said scanning head from said copy holder, and power drive means connected to said drive shaft.

9. The combination of claim 8 wherein said drive shaft has secured thereon a scanning member, and means cooperating with said scanning member to scan a recording web in cooperation with said scanning member.

10. Facsimile apparatus comprising a transmitting scanner and a recording scanner, said transmitting scanner comprising a rotatable and axially movable scanning device, said recording scanner comprising a rotatable drum having scanning means thereon, said scanning device and said drum being in axial alignment, an operative interconnection between said axially aligned scanning device and said drum in the form of an extensible power transmission connection, and means axially aligned with said device and said drum for applying mechanical power to said device and said drum, said last named means including an electric motor having its rotor mechanically coupled to said drum.

CHARLES J. YOUNG.

REFERENCES CITED

The following references are of record in the file of this patent:

UNITED STATES PATENTS

| Number | Name | Date |
|---|---|---|
| 1,740,490 | Wright et al. | Dec. 24, 1929 |
| 1,854,014 | Ballentine | Apr. 12, 1932 |
| 1,857,130 | Alexanderson | May 10, 1932 |
| 1,874,200 | Manderfeld | Aug. 30, 1932 |
| 2,122,974 | Browne | July 5, 1938 |
| 2,163,215 | Schlessinger | June 20, 1939 |
| 2,298,911 | Young | Oct. 13, 1942 |
| 2,317,850 | Finch | Apr. 27, 1943 |
| 2,394,649 | Young | Feb. 12, 1946 |
| 2,413,400 | Young | Dec. 31, 1946 |